United States Patent
Finatti et al.

(10) Patent No.: US 12,465,025 B2
(45) Date of Patent: Nov. 11, 2025

(54) ANIMAL DETECTING DEVICE, SYSTEM, METHOD AND COMPUTER PROGRAM

(71) Applicants: Sony Semiconductor Solutions Corporation, Atsugi (JP); Sony Europe B.V., Surrey (GB)

(72) Inventors: Salvatore Finatti, Basingstoke (GB); Shaun Lee, Basingstoke (GB); Antonio Avitabile, Basingstoke (GB)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 74 days.

(21) Appl. No.: 18/078,947

(22) Filed: Dec. 10, 2022

(65) Prior Publication Data

US 2023/0217902 A1    Jul. 13, 2023

(30) Foreign Application Priority Data

Jan. 10, 2022    (GB) ..................................... 2200223

(51) Int. Cl.
*A01K 29/00*    (2006.01)
*G06T 7/70*    (2017.01)
*G06V 40/10*    (2022.01)

(52) U.S. Cl.
CPC .............. *A01K 29/005* (2013.01); *G06T 7/70* (2017.01); *G06V 40/10* (2022.01); *G06T 2207/30242* (2013.01)

(58) Field of Classification Search
CPC ................... A01K 29/005; G06T 7/70; G06T 2207/30242; G06V 40/10; G06V 20/52; G06V 20/00
See application file for complete search history.

(56) References Cited

U.S. PATENT DOCUMENTS

| | | | | |
|---|---|---|---|---|
| 10,776,695 B1* | 9/2020 | Samples | ................. | G06F 18/24 |
| 11,250,324 B2* | 2/2022 | Samples | ................ | G06V 10/82 |
| 11,537,891 B2* | 12/2022 | Samples | ................. | G06N 3/08 |
| 2014/0333775 A1* | 11/2014 | Naikal | ............. | H04N 21/44008 |
| | | | | 348/159 |
| 2016/0355181 A1 | 12/2016 | Morales | | |

(Continued)

FOREIGN PATENT DOCUMENTS

| | | | | |
|---|---|---|---|---|
| EP | 2608106 A1 * | 6/2013 | ............. | G06V 20/40 |
| EP | 3410343 A1 | 12/2018 | | |

(Continued)

OTHER PUBLICATIONS

Search Report from corresponding United Kingdom Application No. 2200223.2, mailed on Jun. 29, 2022, 12 pages.

*Primary Examiner* — Rufus C Point
(74) *Attorney, Agent, or Firm* — Tucker Ellis LLP

(57) ABSTRACT

An animal detecting device includes circuitry configured to: obtain one or more images; perform image processing on the one or more images, wherein the image processing includes detecting the presence of an animal in one of the one or more images, produce, when the presence of an animal is detected, image representation data associated with the one or more images according to a result of the image processing; and send, in the event of a predetermined condition being met, the image representation data to another device over a communication link.

15 Claims, 16 Drawing Sheets

(56) References Cited

U.S. PATENT DOCUMENTS

| | | |
|---|---|---|
| 2017/0024618 A1* | 1/2017 | Morales Teraoka .. B60W 30/09 |
| 2018/0012460 A1 | 1/2018 | Heitz, III |
| 2020/0226360 A1 | 7/2020 | Bouchard |
| 2020/0285953 A1* | 9/2020 | Samples .............. G06V 10/764 |
| 2020/0323193 A1 | 10/2020 | King |
| 2020/0383299 A1 | 12/2020 | Bermudez Contreras |

FOREIGN PATENT DOCUMENTS

| | | |
|---|---|---|
| EP | 3933766 A1 | 1/2022 |
| WO | 2020037377 A1 | 2/2020 |

* cited by examiner

| Category | Number |
|---|---|
| Horses standing | 1 |
| Horses sitting | 1 |
| Horses running | 1 |
| Horses limping | 0 |

| Category | Number |
|---|---|
| Total creatures | 4 |
| Total horses | 2 |
| Total humans | 1 |
| Total creatures of unknown species | 1 |
| Horses standing | 1 |
| Horses sitting | 0 |
| Horses running | 1 |
| Horses limping | 0 |

FIG. 11

ANIMAL DETECTING DEVICE, SYSTEM, METHOD AND COMPUTER PROGRAM

CROSS REFERENCE TO RELATED APPLICATIONS

The present application claims priority to United Kingdom Patent Application No. 2200223.2, filed Jan. 10, 2022, the content of which is incorporated herein by reference in its entirety.

BACKGROUND

Field of the Disclosure

The present disclosure relates to an animal detecting device, system, method and computer program.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

When keeping animals such as livestock, it is often useful to monitor the animals without requiring a human to do so. For example, it can be beneficial to keep track of how many animals are in a certain area, or to identify when an animal is behaving unusually. When a human (such as a farm employee) must frequently keep watch over the animals to do this, the process is susceptible to human error, extremely time-consuming, and expensive. It is also difficult to implement when attempting to monitor a large area and/or a high number of animals.

Existing methods of digitally monitoring livestock include providing wearable devices to the animals. However, wearable technology is invasive, expensive and only provides information relating to animals provided with a device. Wearable devices can also be unreliable due to the risk of damage or becoming unattached from the animal. Another solution comprises setting up cameras to continuously capture images of particular areas, but this method can use a high amount of power and be both inefficient and expensive. It is also desirable to provide anonymity to people when their image is captured.

It is an aim of embodiments of this disclosure to address these issues.

SUMMARY

The present disclosure is defined by the claims.

BRIEF DESCRIPTION OF THE DRAWINGS

Non-limiting embodiments and advantages of the present disclosure will be best understood by reference to the following detailed description taken in conjunction with the accompanying drawings, wherein:

FIG. 8 shows a table 800 in embodiments.

FIG. 11 shows a table 1100 in embodiments.

Like reference numerals designate identical or corresponding parts throughout the drawings.

DETAILED DESCRIPTION OF THE EMBODIMENTS

Figure 1:
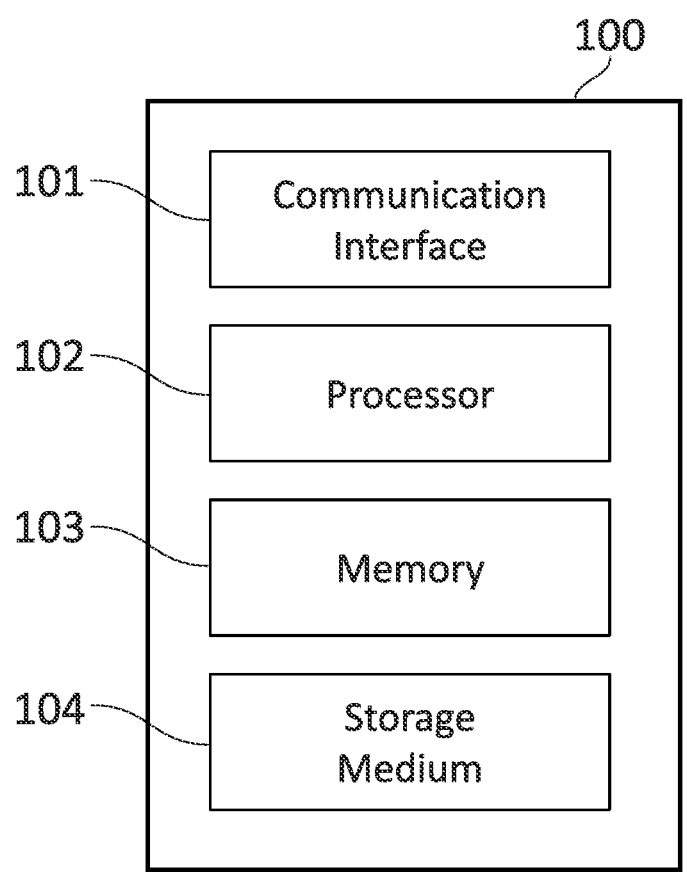
FIG. 1 shows a configuration of an animal detecting device 100 according to embodiments of the disclosure.

FIG. 1 shows a configuration of an animal detecting device 100 according to embodiments of the disclosure. The animal detecting device 100 comprises a communication interface 101 for sending electronic information to and/or receiving electronic information from one or more other devices, a processor 102 for processing electronic instructions, a memory 103 for storing the electronic instructions to be processed and input and output data associated with the electronic instructions and a storage medium 104 (e.g. in the form of a hard disk drive, solid state drive, tape drive or the like) for long term storage of electronic information. Each of the communication interface 101, processor 102 and memory 103 are implemented using appropriate circuitry, for example. The circuitry may be embodied as solid state circuitry which may be controlled by software or may be an Application Specific Integrated Circuit. The software comprises computer readable instructions, which when loaded onto a computer or circuitry, configures the computer (or circuitry) to perform a method according to embodiments. The software is stored on the storage medium 104. The processor 102 controls the operation of each of the communication interface 101, memory 103 and storage medium 104. In some embodiments the animal detecting device 100 may be, for example, an edge computing IoT (Internet Of Things) sensor device.

Figure 2:
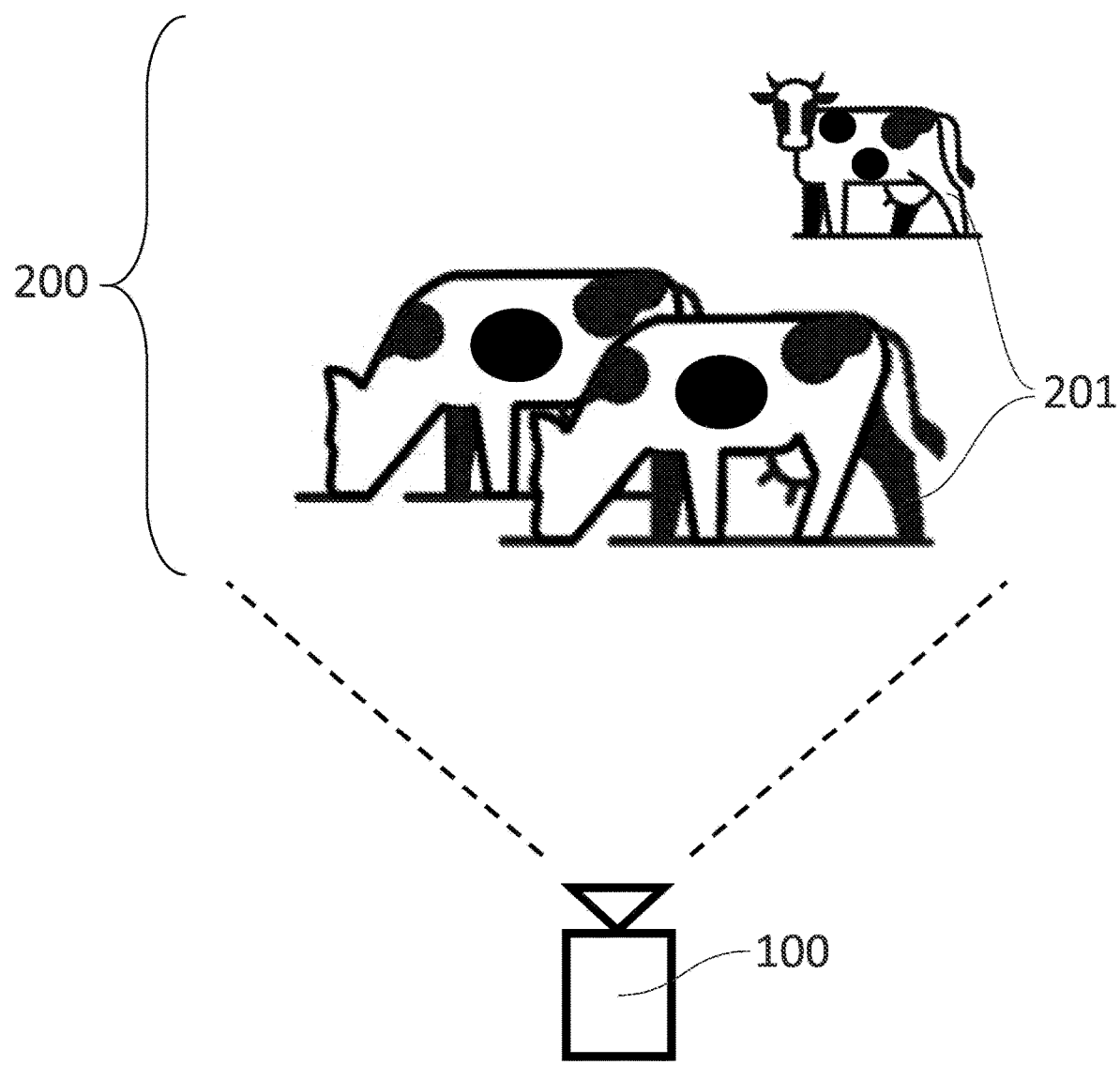
FIG. 2 is a diagram showing the animal detecting device 100 according to embodiments.

FIG. 2 is a diagram showing the animal detecting device 100 according to embodiments. In FIG. 2, the animal detecting device 100 obtains one or more images of a real-world scene 200 containing animal subjects 201. Here, the animal detecting device 100 comprises an image capturing device configured to capture the one or more images of the real-world scene 200. However, the disclosure is not limited in this regard and in other embodiments the animal detecting device 100 is configured to obtain the one or more images from another device (such as a camera) via a communication link, or a combination of the two. The communication link may be any suitable type of communication link known in the art (for example, a wireless or wired connection) through which electronic information can be received by the communication interface 101. In some embodiments, the images are captured and immediately obtained by the device with a sufficiently low latency that the images are substantially obtained in real-time. However, the disclosure is not limited in this regard and in other embodiments the one or more images obtained by the animal detecting device 100 may have been captured in the past.

The animal detecting device 100 may obtain images from any suitable image capturing device configured to capture one or more images of a real-world scene. In some embodiments the image capturing device may be an infrared or near-infrared imaging device, such as a thermal camera or night vision device. Obtaining images captured using light beyond the visible spectrum is particularly advantageous in circumstances where the scene is dark (such as at night) since the images will contain more information about the scene than images captured using only visible light. However, the disclosure is not limited in this regard and in some embodiments the image capturing device uses other image sensing technologies. For example, the image capturing device may be a device configured to capture images using Time of Flight, Dynamic Vision Sensing, Structured Light, Radar or Lidar technology.

Alongside obtaining the one or more images, in some embodiments the animal detecting device 100 may obtain additional information relating to the images from the image capturing device. For example, the device may obtain time stamps indicating a time scale over which the images were captured, either relative to each other or relative to a local time. In other examples, the device may obtain settings of the image capturing device such as the focal length and/or image capture rate of a camera.

Having obtained the one or more images, in embodiments, the animal detecting device 100 stores the images in the storage medium 104. The one or more images are then sent to the processor 102 in order to perform image processing as described below. However, the disclosure is not limited in this regard and in other embodiments the images may be sent directly to the processor 102. In embodiments where additional information is obtained, this information may similarly be sent directly to the processor 102 or first stored in the storage medium 104.

The animal detecting device 100 next performs image processing on the one or more obtained images. The image processing comprises processing that detects the presence of an animal in one of the one or more images. This may be achieved by any suitable image processing technique known in the art that can be implemented for object detection, pattern matching or the like. For example, in some embodiments the presence of an animal is detected using artificial intelligence.

In embodiments depicted in FIG. 2, where images are obtained of the scene 200, the image processing detects the presence of the animal subjects 201. However, the image processing is not limited to this process alone and in various embodiments the image processing further comprises a number of additional processes. For example, in some embodiments where the obtained images depict the scene 200, the image processing may further include processing that identifies a species of a detected animal and the total number of detected animals. In these embodiments, the image processing may therefore produce a result indicating that three cows have been detected in an image. Examples of the image processing performed in various embodiments are described in more detail with reference to FIGS. 7-11 below.

In some embodiments the image processing is performed on every image obtained. The device can therefore determine a very high and possibly maximum amount of information about the scene over a certain time period, as the number of image processing results produced in that time period is very high and possibly maximised. However, the disclosure is not limited in this regard and in other embodiments the image processing may be performed on a certain number of the obtained images. This allows the device to save processing power when less information about a scene is desired. For example, the animal detecting device 100 may be configured to perform image processing on a greater proportion of obtained images (e.g. every image) during the daytime when frequent processing results are desired, and a smaller proportion of obtained images (e.g. every other image) during the night when frequent processing results are not desired. More frequent image processing also allows more precise information to be obtained about how a scene changes over time, such as when an animal moves across the scene rapidly. In addition, information relating to the timescales of events (e.g. the speed of an animal) can be calculated more accurately, and the start of a particular event can be identified more rapidly when the animal detecting device 100 is reporting information to another device in real-time.

After performing the image processing, the animal detecting device 100 then determines whether a result of the image processing indicates that the presence of an animal has been detected in the image. If the presence of an animal has not been detected, one or more results of the image processing may be stored in the storage medium 104, sent to another device or discarded. When the presence of an animal has been detected however, the animal detecting device 100 creates image representation data associated with that image according to a result of the image processing. In other words, the animal detecting device 100 produces the image representation data associated with the image according to a result of the image processing in response to the detection of the presence of an animal in the image. The image representation data is information that indicates a result of the image processing performed for the image, and takes up less storage space than the total image data for the image. It may comprise information in any suitable format, such as data values in a table or image data, and in some embodiments comprises information in multiple formats. For example, image representation data may comprise image data that depicts the scene in a smaller resolution than the original image data. In another example, image representation data may be metadata associated with the image that indicates a result of the image processing. Such metadata may be in any suitable format known in the art, such as data values in a table, and the present disclosure is not limited in this regard.

Figure 3:
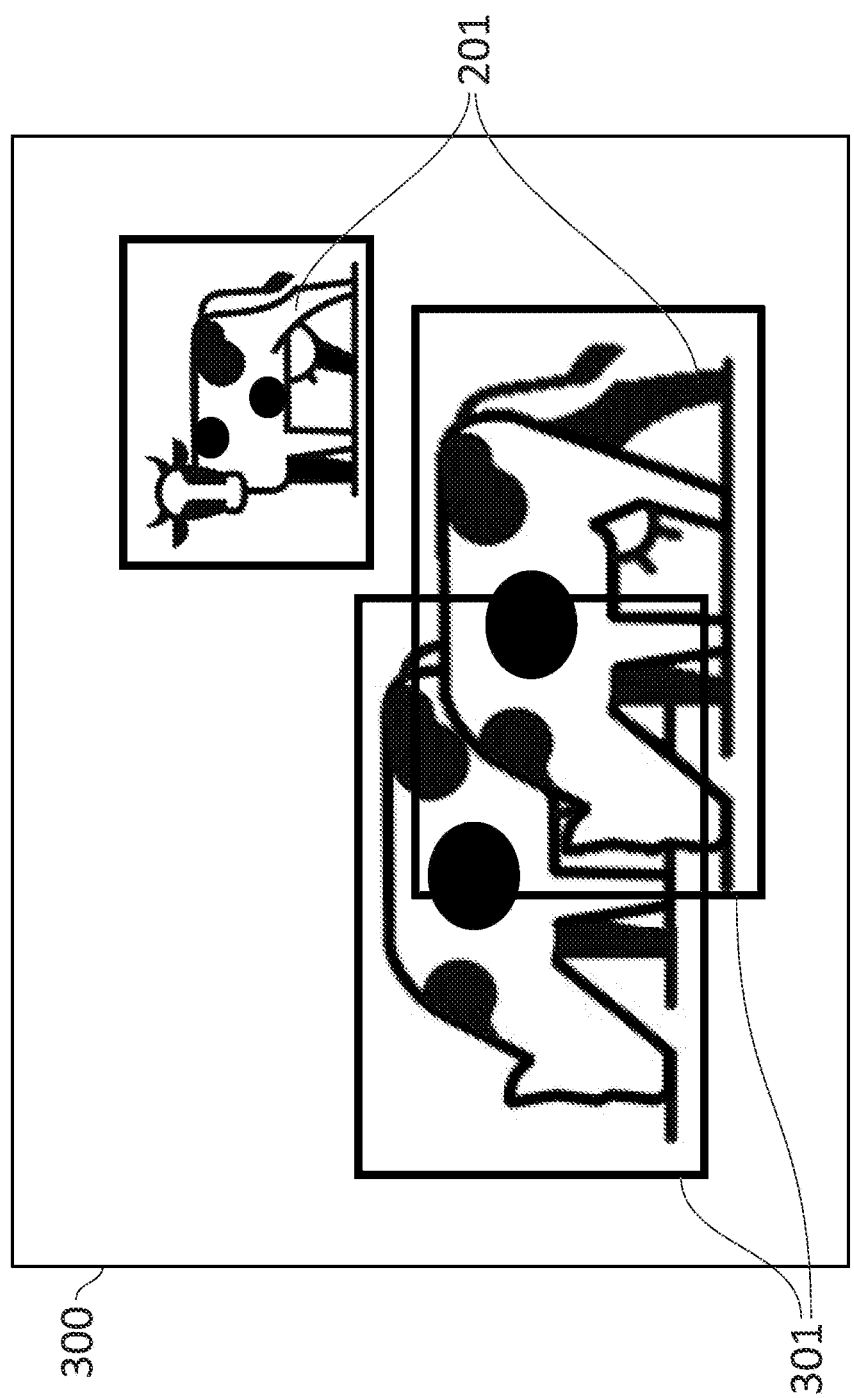
FIG. 3 shows an image 300 of a scene 200 in embodiments.
Figure 4:
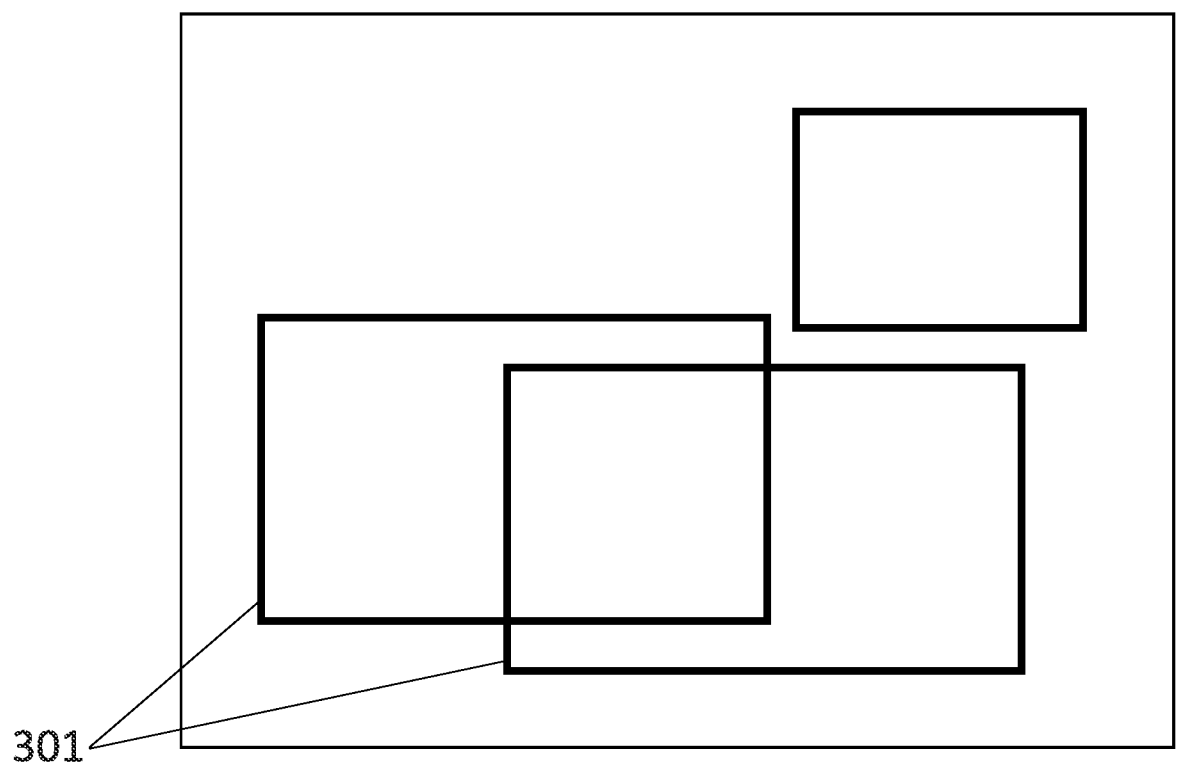
FIG. 4 shows frames 301 that are included in metadata associated with the image 300 in embodiments.

FIG. 3 shows an image 300 of the scene 200 in embodiments. Metadata has been created as a result of image processing performed on the image 300. In these embodiments, the metadata is in a format comprising frames 301 that indicate the presence, general shape and position in the image of each of the animal subjects 201. These frames 301 are shown superimposed on the image 300 in FIG. 3. In contrast, FIG. 4 depicts the frames 301 without the addition of the image 300. It can be seen that, compared to the image 300, the frames 301 provide much less information about the scene 200. The metadata comprising the frames 301 can therefore take up much less storage space than the total image data. In further embodiments, the metadata comprises information in other formats. This is described in more detail below with reference to FIGS. 7-11.

Figure 5:
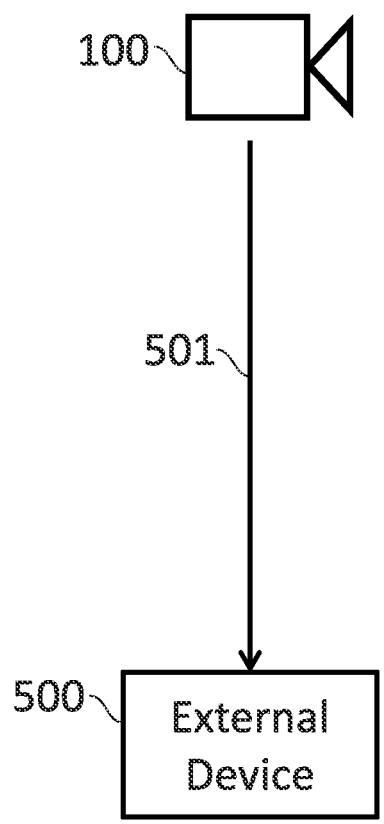
FIG. 5 is a diagram depicting the animal detecting device 100 and an external device 500 in embodiments.

Having created the image representation data, the animal detecting device 100 then determines whether a predetermined condition has been met. If it is determined that the predetermined condition has not been met, the image representation data may be stored in the storage medium 104, sent to another device or discarded. If it is determined that the predetermined condition has been met, some or all of the image representation data is sent to another device. This is shown in FIG. 5, in which the animal detecting device 100 sends image representation data 501 to an external device 500 via a communication link. The external device 500 may be any device capable of receiving electronic information. For example, the external device 500 may be a remote server which stores the image representation data 501 and/or sends it to a further device. In another example, the external device 500 may be a user device such as a smart phone. The communication link may be any suitable type of communication link known in the art (for example, a wireless or wired connection) over which electronic information can be sent by the communication interface 101 of the animal detecting device 100.

As discussed above, the image representation data 501 associated with a particular image comprises less information than the total image data obtained by the animal detecting device 100. Sending image representation data 501 to the external device 500 is therefore more efficient than sending the total image data when monitoring a scene, as power is saved and relevant information about the scene is provided in a more reliable manner. For instance, if a user wishes to monitor a scene remotely the user may not need to know all the information about the scene captured by a camera. As an example, if a farmer wishes to monitor a field containing livestock the farmer may only wish to know the number of animals in the field at a particular time. Any additional information (such as information relating to details of the individual appearances of the animals) is not relevant, and so providing this additional information to the farmer would be a waste of power and if appropriate, network capacity. By performing image processing on images to determine key relevant information, creating image representation data 501 to indicate a result of the image processing and sending only the image representation data 501 to the external device 500, the animal detecting device 100 can ensure that only relevant information about the scene is reported and power consumed and network capacity is reduced. Moreover, image representation data 501 is only created when the presence of an animal has been detected in an image, so no information is sent to the external device 500 when the scene does not contain any animals. The absence of any provided information corresponding to a particular time therefore indicates an absence of animals in the scene without requiring a signal to be sent.

Power saving is particularly advantageous for monitoring devices such as the animal detecting device 100, as these are often located where a wired power supply would be inefficient or unattainable. Such devices are therefore often powered by batteries, and so power saving increases the amount of time they can be used without requiring a manual battery change (a task which is particularly inconvenient when the devices are located far from each other and/or people). Sending only the image representation data 501 to the external device 500 also requires less bandwidth, and so relevant information about a scene can be provided in a more reliable and efficient manner when bandwidth is limited (for example in rural areas).

An additional advantage to only sending image representation data 501 is that a greater level of privacy is ensured for any people that may enter the scene, particularly in embodiments where the original image data is discarded. For example, farm employees that frequently work in areas being imaged may not wish for the image data to be stored or sent to the external device 500 to be viewed. Reporting image representation data 501 to the external device 500 would instead provide limited information about the employees (such as their approximate position in the scene) and therefore offer more privacy.

In some embodiments, the predetermined condition is based on a result of the image processing. For example, the predetermined condition may be: 'the presence of an animal has been detected in two consecutively-obtained images'. In this example, the animal detecting device 100 may determine that the predetermined condition has been met if results of the image processing indicate that an animal was detected in two consecutive images. In embodiments where the image processing comprises additional processes that indicate more information about the scene (e.g. processing that identifies a species of a detected animal), the determination may be based on multiple results of the image processing. For example, the predetermined condition may be: 'fewer than two cows have been detected'. Various embodiments in which the determination is based on a result of the image processing are described in more detail below with reference to FIGS. 7-11.

In further embodiments, the predetermined condition is additionally or alternatively based on information that is not a result of the image processing. For example, the predetermined condition may be: 'ten images have been obtained'. In this example, the animal detecting device 100 may determine that the predetermined condition has been met if it is determined that ten images have been obtained. In embodiments where the animal detecting device 100 obtains additional information relating to the images before image processing is performed (e.g. time stamps indicating a time scale over which the images were captured), the determination may be based on this additional information (e.g. if the predetermined condition is 'images captured over 3 seconds have been obtained'). The disclosure is not limited in this regard however and the predetermined condition may be based on any suitable information available to the animal detecting device 100.

In some embodiments of the disclosure the predetermined condition may be dependent on more than one condition, such that the predetermined condition may be met in more than one instance. For example, in some embodiments the predetermined condition may be 'fewer than two cows have been detected OR fewer than three horses have been detected'.

Sending image representation data 501 to the external device 500 only when a predetermined condition is met further increases the efficiency of the animal detecting device 100. It allows the device to not simply report only relevant types of information (e.g. the number of animals present in a scene, rather than the total image data), but relevant types of information that indicate a desired result. For example, a farmer may only wish to know the approximate position of animals in a scene if a result of the image processing indicates that the animals are cows.

Moreover, in some embodiments the animal detecting device may further ensure that only relevant information is sent to the external device 500 by sending only a certain portion of the image representation data 501 to the external device 500. For example, in some embodiments where the predetermined condition requires that a horse has been detected in an image, the animal detecting device 100 is configured to, having determined that this condition has been met, send only image representation data 501 that relates to horses in the image. As a result, even if the image processing has determined information about other animals (such as a dog) in the image, this is not sent to the external device.

In some embodiments where the one or more images are substantially obtained in real-time, image processing and the subsequent creation of image representation data 501 are immediately performed. In these embodiments, image representation data 501 can then be sent to the external device with a latency low enough that the animal detecting device 100 substantially provides the external device with information about images in real-time. This is particularly advantageous in situations where a user wishes to receive up-to-date information about a scene, for example if a farmer wishes to monitor an event occurring in a scene (such as a fight between two animals) in real-time.

Figure 6:
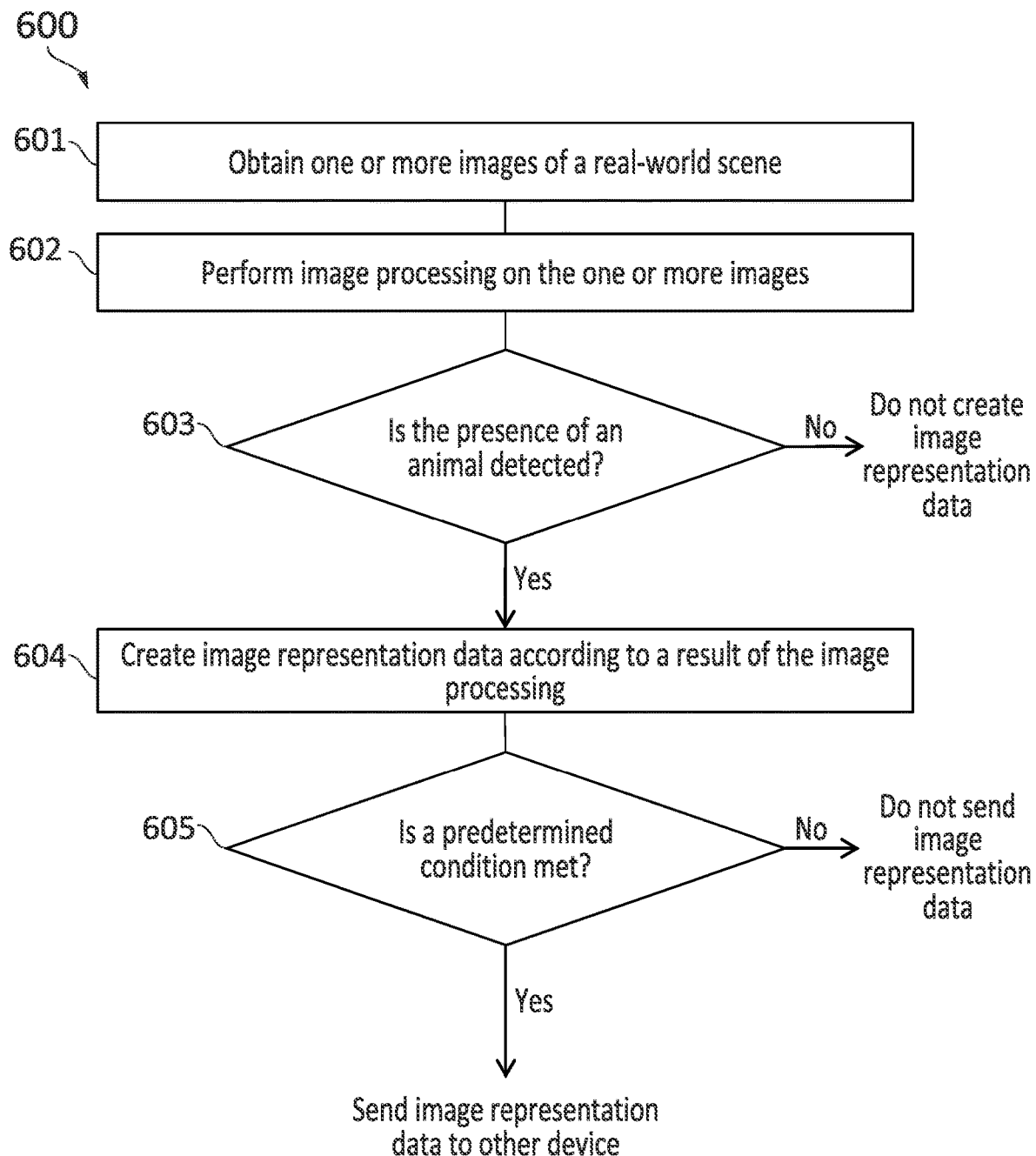
FIG. 6 is a flowchart of a method 600 carried out by the animal detecting device 100 in embodiments.

FIG. 6 is a flowchart showing a method 600 carried out in embodiments by the animal detecting device 100. In step 601 the animal detecting device 100 obtains one or more images of the real-world scene 200. In step 602 the animal detecting device 100 performs image processing on the one or more images. In step 603 it is determined whether the result of the image processing in step 602 indicates that the presence of an animal has been detected in the image. If the presence of an animal has not been detected, the animal detecting device 100 does not continue to step 604 of the method 600 and image representation data is not created. If the presence of an animal has been detected, the animal detecting device 100 continues to step 604. In step 604, image representation data 501 associated with that image is created according to a result of the image processing. Finally, in 605 it is determined whether a predetermined condition has been met. If it is determined that the predetermined condition has been met, the animal detecting device 100 sends the image representation data 501 to the external device 500. If it is determined that the predetermined condition has not been met, the animal detecting device 100 does not send the image representation data to the external device 500.

FIGS. 7-11 depict embodiments in which the image processing comprises processing that determines additional information about an image. However, the present disclosure is not limited in this regard and the additional information may be any information that can be determined from an image with known image processing techniques.

Figure 7:
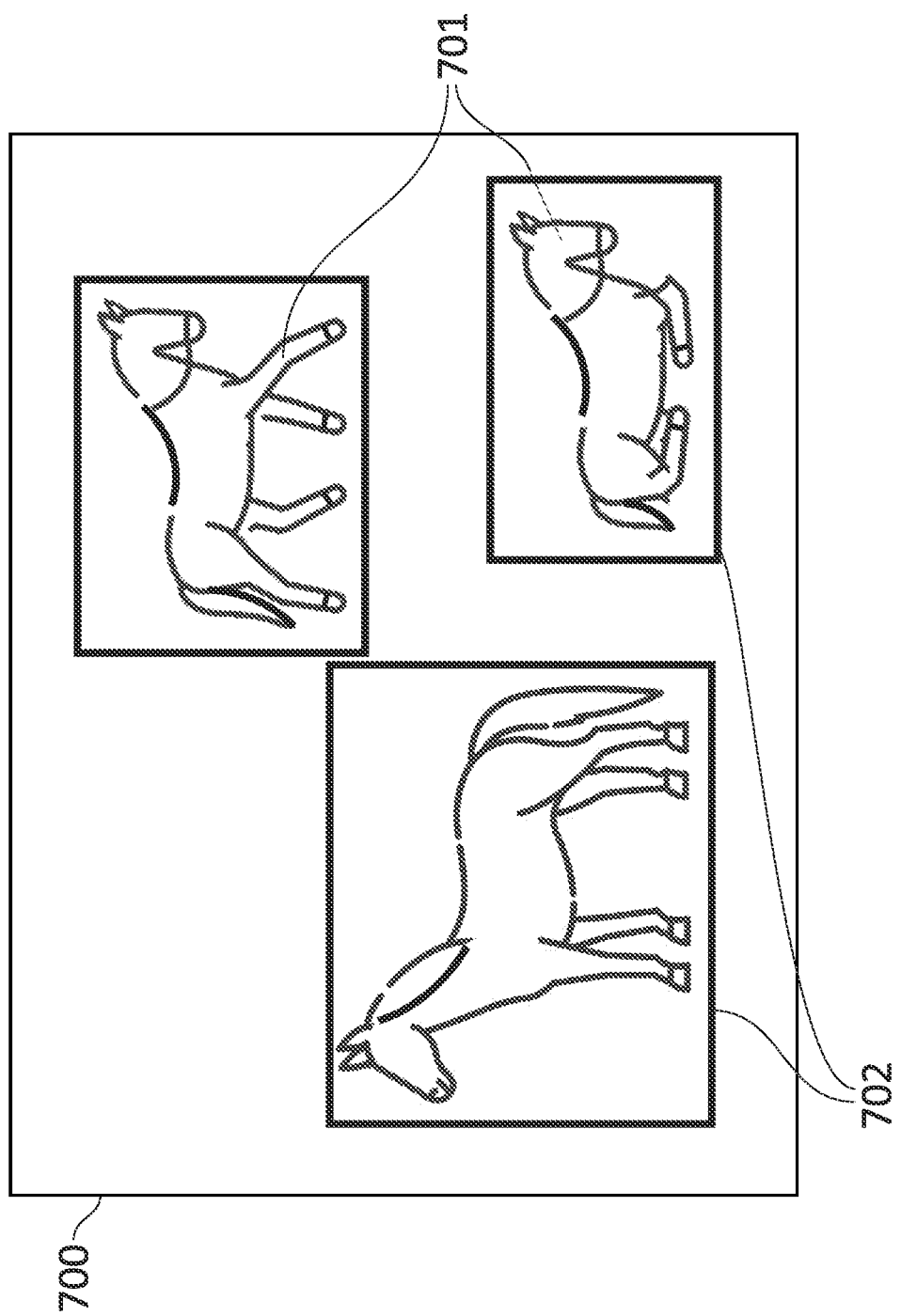
FIG. 7 shows an image 700 of a scene containing animal subjects 701 in embodiments.
Figure 9:
FIG. 9 shows a table 900 in embodiments.

FIG. 7 shows an image 700 in embodiments of a scene containing animal subjects 701. Metadata comprising frames 702, shown superimposed on the image 700, has been created as a result of image processing performed on the image. In a similar manner to the frames 301 shown in FIG. 3, it can be seen that the frames 702 indicate the presence, general shape and position in the image of each of the animal subjects 701. In these embodiments however, the image processing determines additional information about the image 700 that is indicated by additional metadata in the format of data values arranged in a table.

FIG. 8 shows a table 800 populated with data values that indicate results of the image processing on the image 700. It can be seen that the image processing has not only detected the presence of three animals in the image 700, but has identified the species and pose of each detected animal. This may be achieved by any suitable image processing technique known in the art that can be implemented for object recognition, including techniques such as skeletal tracking.

Identifying the pose of an animal is beneficial in situations where a user wishes to review the behaviour or condition of an animal over a certain period of time, for example if a user wishes to know how often a horse spent running compared to walking over 12 hours. The animal detecting device 100 can similarly be configured to monitor the progress of an animal's recovery from an injury if, for example, image processing results show how the animal's limping becomes less pronounced over time. Information about the pose of a detected animal is also desirable when a user wishes to know, either retrospectively or immediately, if an animal takes a specific pose. A farmer may wish to be informed immediately if a detected animal is identified to have a pose that indicates it has fallen, for example. This is achieved in embodiments where the animal detecting device 100 is configured to only send image representation data to the external device 500 when the predetermined condition that 'a detected animal is identified to be limping' is met, or when the animal detecting device 100 is configured to additionally send an alert to a user device if this condition is met. This is described in more detail below with reference to FIG. 12.

Identifying the species of an animal allows the animal detecting device 100 to provide species-specific information to the external device 500, and to avoid sending inaccurate and/or unnecessary information to the external device 500. This is discussed in more detail with reference to FIGS. 10-11 below.

In table 800, this information is used to categorize each animal and record a number of total animals in each category (e.g. 'horses standing' and 'horses running'). However, the disclosure is not limited in this regard and in other embodiments information relating to the species and pose of each detected animal may be recorded in other formats. This can be seen in FIG. 9, which shows a table 900 in which data is recorded in further embodiments. In table 900, each detected animal is assigned a separate entry (e.g. 'Animal 1' and 'Animal 2') for which additional information can be added in a number of categories. For example, the detected animal 'Animal 1' has been identified to have the species 'horse' and the pose 'standing'. In some embodiments, specific animals are identified in each image: for example, a particular detected animal may be labelled consistently across multiple images by recognising identical distinguishing features (e.g. coat pattern) between images, or based on extrapolation of the animal's position between images.

In these embodiments, the image processing has identified the approximate position of each detected animal and assigned them a level of priority. As a result, table 900 contains the categories 'Position' and 'Priority level': for example, 'Animal 1' has the position '$(x_1, y_1, z_1)$' and the priority level 'high'. The animal detecting device 100 may determine the approximate position of an animal from the position of the animal in the image, the focal length of the image capturing device used to capture the image, and the position of the image capturing device using any suitable technique known in the art. Providing the approximate position of detected animals in a scene is desirable when a user wishes to review where animals are located over time, for example to identify areas of the scene where grass is being grazed more frequently. This is also desirable in embodiments where the user wishes to identify if an animal enters a particular area of the scene (for example, a restricted area).

The assigned 'priority level' may be determined based on other image processing results. For example, an animal identified to fall in one or more categories (e.g. 'young', 'pregnant', 'injured', 'horse' or the like) may be assigned a 'high' priority level whilst an animal identified to not fall into those categories may be assigned a 'low' priority level. In some embodiments, the predetermined condition which must be met for image representation data to be sent to the external device 500 may be based on the priority level of a particular animal. For example, image representation data may only be sent if an image contains a detected animal that is assigned the 'high' priority level. As another example, in some embodiments the predetermined condition is 'an image contains a detected animal with a high priority level OR 50 images have been obtained'. In these embodiments the animal detecting device 100 usually sends image representation data to the external device 500 every time 50 images have been obtained, but when an animal is detected that is assigned a 'high' priority level the image representation data is sent immediately.

Figure 10:
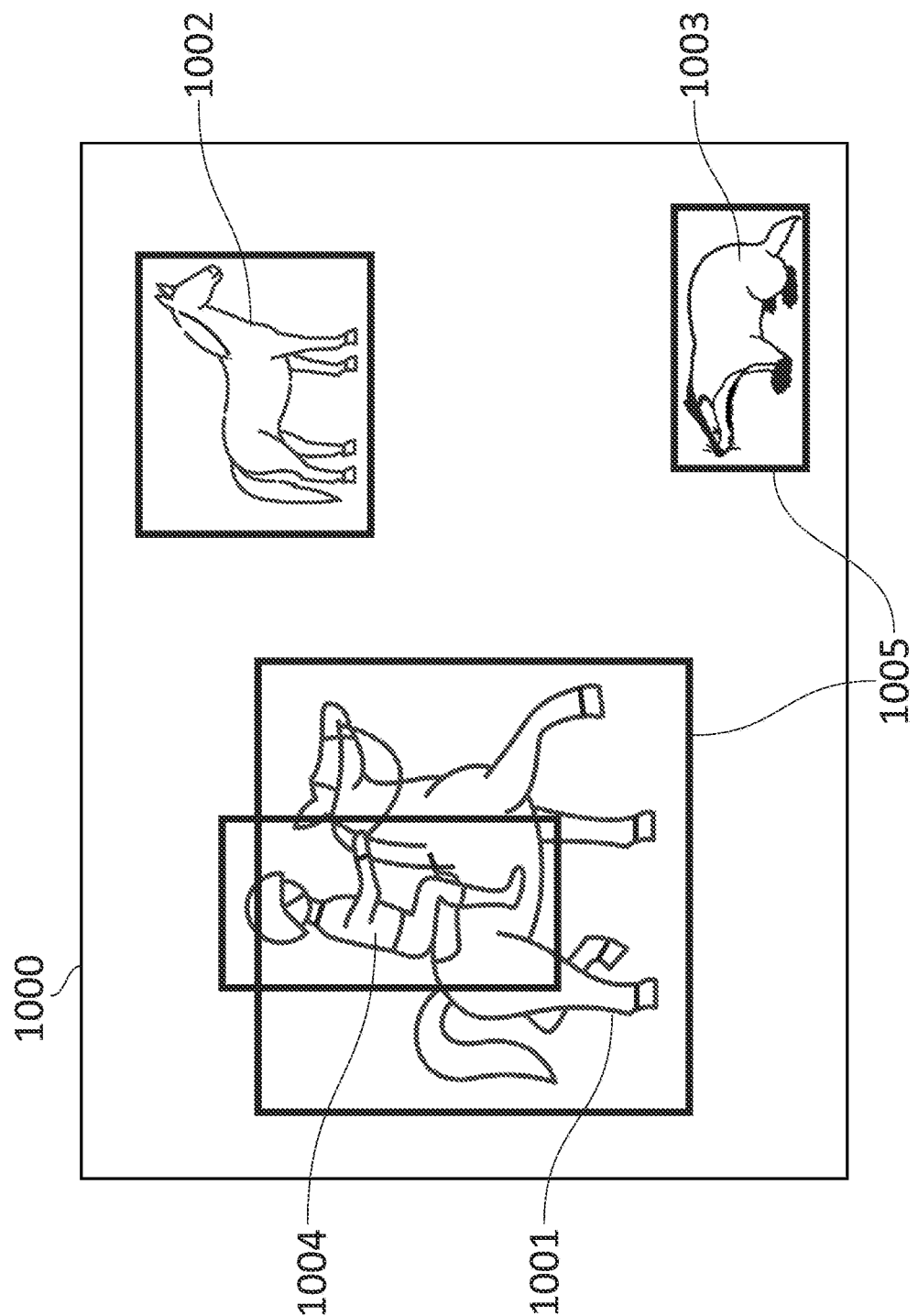
FIG. 10 shows an image 1000 of another scene in embodiments.

FIG. 10 shows an image 1000 of another scene in embodiments. This scene contains a number of detected creatures including detected animals 1001, 1002 and 1003 as well as a detected human 1004. Metadata comprising frames 1005, shown superimposed on the image 1000, has been created as a result of image processing performed on the image. FIG. 11 shows a table 1100 populated with data values that indicate results of the image processing performed on the image 1000 in embodiments. Similarly to table 800, information relating to an identified species and pose of the creatures 1001-1004 is used to categorize each creature and record a number of total creatures in each category (e.g. 'total humans' and 'horses standing'). It can be seen from table 1100 that the image processing has identified that the detected creatures 1001 and 1002 are horses and the detected creature 1004 is a person.

Table 1100 shows that the image processing has identified the detected creature 1003 to be an unknown species that is not a horse or a human. However, the invention is not limited in this regard and in other embodiments the animal detecting device 100 may perform further image processing to determine the species of the animal rather than simply identifying it as an unknown species. This further image processing may be performed using information received from another device, such as discussed below with reference to FIG. 15. In further embodiments, when the image processing identifies that a detected animal has an unknown species the animal detecting device 100 is configured to connect to the internet and determine the species of the animal using additional information obtained from the internet.

Identifying the species of an animal is beneficial as it can allow the animal detecting device 100 to avoid providing inaccurate data to the external device 500. For example, image representation data that indicates a number of animals in a scene may not be useful for counting livestock if only some of the detected animals are livestock and others are other creatures (e.g. wildlife, people, dogs or the like). As another example, if the image processing cannot identify creatures that are not horses there is a greater risk that it may produce inaccurate information relating to detected horses: for example, the human 1004 riding the horse 1001 could be falsely identified as a horse taking a certain pose. The ability to identify the species of an animal can therefore improve the accuracy of the image representation data.

In some embodiments the species of a detected animal is also used to avoid sending unnecessary data. For example, in certain embodiments the predetermined condition may specify that image representation data relating to detected animals identified to be mice should not be sent to the external device 500. In contrast, in some embodiments it may be particularly desirable to provide information about certain species of animal that are not livestock. For example, if a badger is known to enter a field and destroy plants at night, it is useful for the owner of the field to know the approximate location at which the badger enters the field. In this example, the animal detecting device 100 can identify that a detected animal is a badger (or simply an unknown species) and determine the position of the badger when it enters the field. Identifying the species of an animal can therefore provide more useful image representation data.

Figure 12:
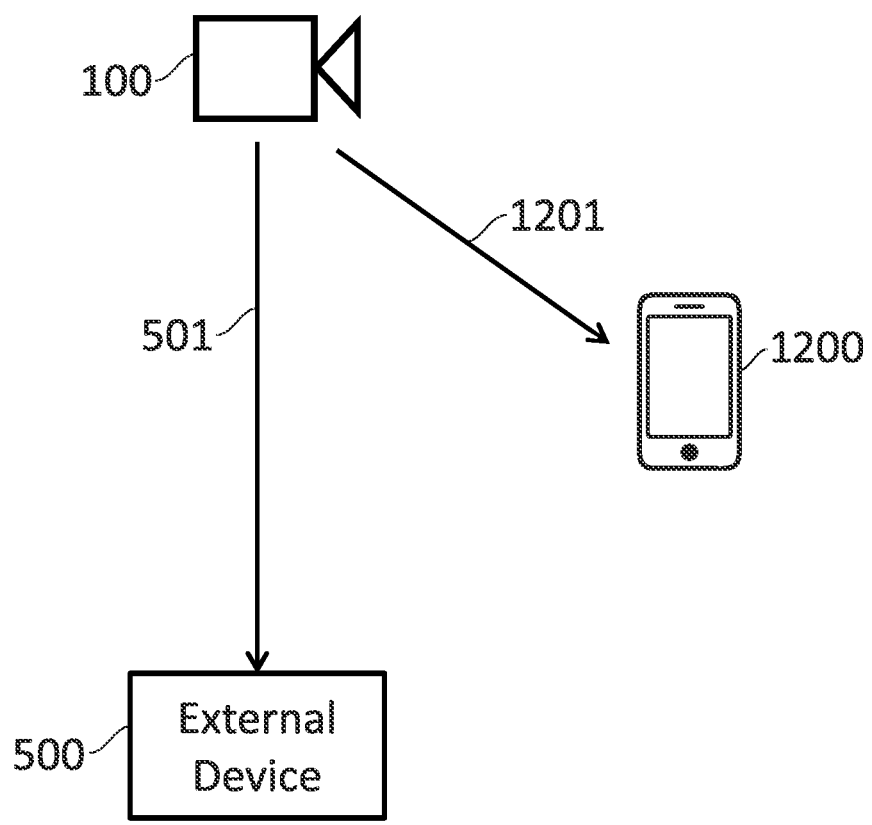
FIG. 12 is a diagram showing the animal detecting device 100 in further embodiments.

FIG. 12 shows the animal detecting device 100 in further embodiments. Image representation data 501 is sent to an external device 500 in the same manner as discussed above with reference to FIG. 5. However, here the animal detecting device 100 additionally sends an alert 1201 to a user device 1200. The alert 1201 comprises information that indicates a result of the image processing and may be transmitted via any suitable communication link known in the art (for example, a wireless or wired connection) over which electronic information can be sent by the communication interface 101 of the animal detecting device 100. The user device 1200 may be any suitable user device known in the art, such as a laptop or smartphone.

In some embodiments the animal detecting device 100 sends the alert 1201 in response to a determination that a second predetermined condition is met. Such a second predetermined condition may be equal to the first predetermined condition which must be met for image representation data 501 to be sent to the external device 500, or may be a separate predetermined condition. In the same way as with the first predetermined condition, in various embodiments the second predetermined condition may be based on a result of the image processing and/or information that is not a result of the image processing.

For example, in some embodiments the alert 1201 may be sent if the image processing has identified that a detected animal is taking a certain pose, and contains information indicating this result. This is beneficial in situations where a user needs to be informed quickly when a certain event occurs in a scene so that they may respond as appropriate. For example, if an animal is identified to have a pose that only occurs when it is fighting another animal, a farmer may wish to be informed immediately so that they can go to the field and prevent the animals fighting. In another example, if a pregnant animal is identified to have a pose that only occurs when it is about to give birth, a farmer may want to be informed immediately so that they may go to the animal and facilitate the birth as it occurs. This is particularly useful when such an event occurs at a time when the farmer is unable to review the image representation data 501 sent to the external device 500 in real-time, for example at night. In some embodiments, the alert 1201 comprises additional information such as the location of the animal detecting device 100 (so that, for example, a farmer could find a particular animal more quickly).

Figure 13:
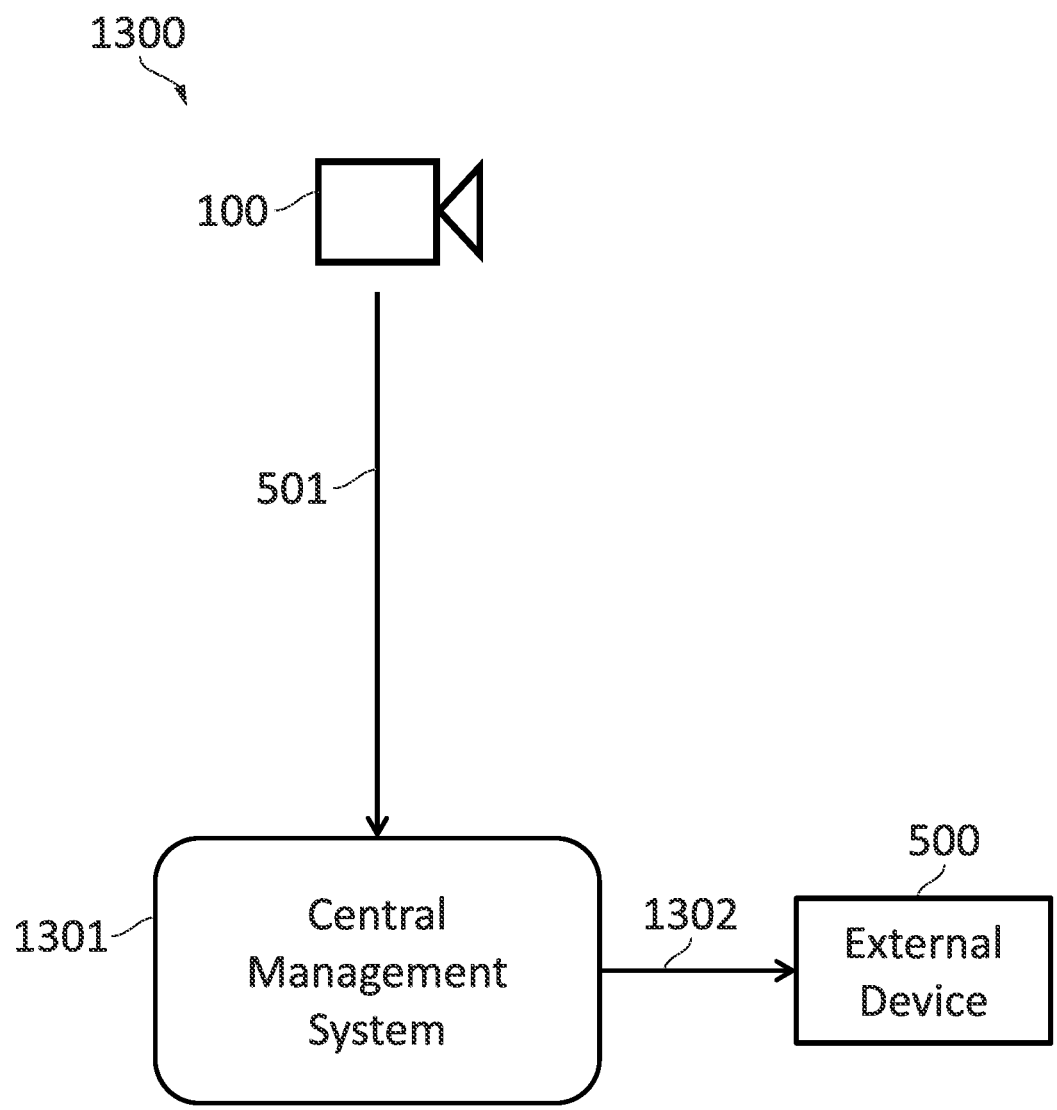
FIG. 13 depicts a system 1300 in embodiments.

FIG. 13 depicts a system 1300 comprising the animal detecting device 100 and a central management system 1301 in embodiments. The animal detecting device 100 is configured to send image representation data 501 to the central management system 1301, which performs an analysis on the image representation data 501. The central management system 1301 then sends a result of the analysis 1302 to the external device 500. However, the disclosure is not limited in this regard and in other embodiments the central management system 1301 does not send the analysis result 1302 to the external device 500. For example, in some embodiments the central management system 1301 stores the analysis result 1302 in a storage medium. In some embodiments the central management system 1301 additionally sends the image representation data 501 to the external device 500.

The central management system 1301 may be any information processing system capable of at least receiving electronic information and processing the information in an analysis process according to embodiments. For example, the central management system 1301 may be a system of one or more devices (e.g. user devices, remote devices such as servers located in the cloud, or the like). In some embodiments, having received the image representation data 501 the central management system 1301 stores it in a storage medium before performing the analysis. However, the disclosure is not limited in this regard and in other embodiments the analysis may be immediately performed on the image representation data 501.

The analysis process may comprise any suitable information analysis which can be achieved using known processing techniques. For example, in some embodiments the analysis process comprises image processing that determines the species of a detected animal. In certain embodiments, the animal detecting device 100 may be configured to send image representation data 501 to the central management system 1301 that comprises image data related to a detected animal that has been identified to have an unknown species. The central management system 1301 then determines the species of the animal using additional information. Such additional information may be stored in a storage medium within the central management system, or received from an external source such as the internet or another device (e.g. an external database). The central management system 1301 may then send the external device 500 an analysis result 1302 indicating the species of the detected animal as well as the image representation information 501.

By configuring the central management system 1301 to perform further processing on the information representation data 501, additional information about the imaged scenes can therefore be provided to the external device 500 without requiring the animal detecting device 100 to use more processing power. This is particularly beneficial in embodiments where the animal detecting device 100 is a low-power device with a limited access to back-up power, as described earlier.

In some embodiments, the central management system 1301 performs the analysis separately on image representation data that is associated with separate images. However, the disclosure is not limited in this regard and in other embodiments the central management system 1301 performs analysis on image representation data associated with multiple images. For example, in some embodiments the analysis performed by the central management system 1301 may comprise calculating the speed of a detected animal by comparing the calculated positions of the animal in consecutive images, if the image capture rate is known. In further embodiments the central management system 1301 receives image representation data from multiple animal detecting devices such as the animal detecting device 100 and performs the analysis using information from all the image representation data received. For example, the central management system 1301 may determine if any of the multiple animal detecting devices have identified that a detected animal is limping within a certain time period, or if any of the devices have identified that a detected animal is a badger within a certain time period. The central management system 1301 can therefore provide relevant information to a user that relates to multiple scenes at once, rather than requiring the user to check information from each individual animal detecting device 100 separately.

Figure 14:
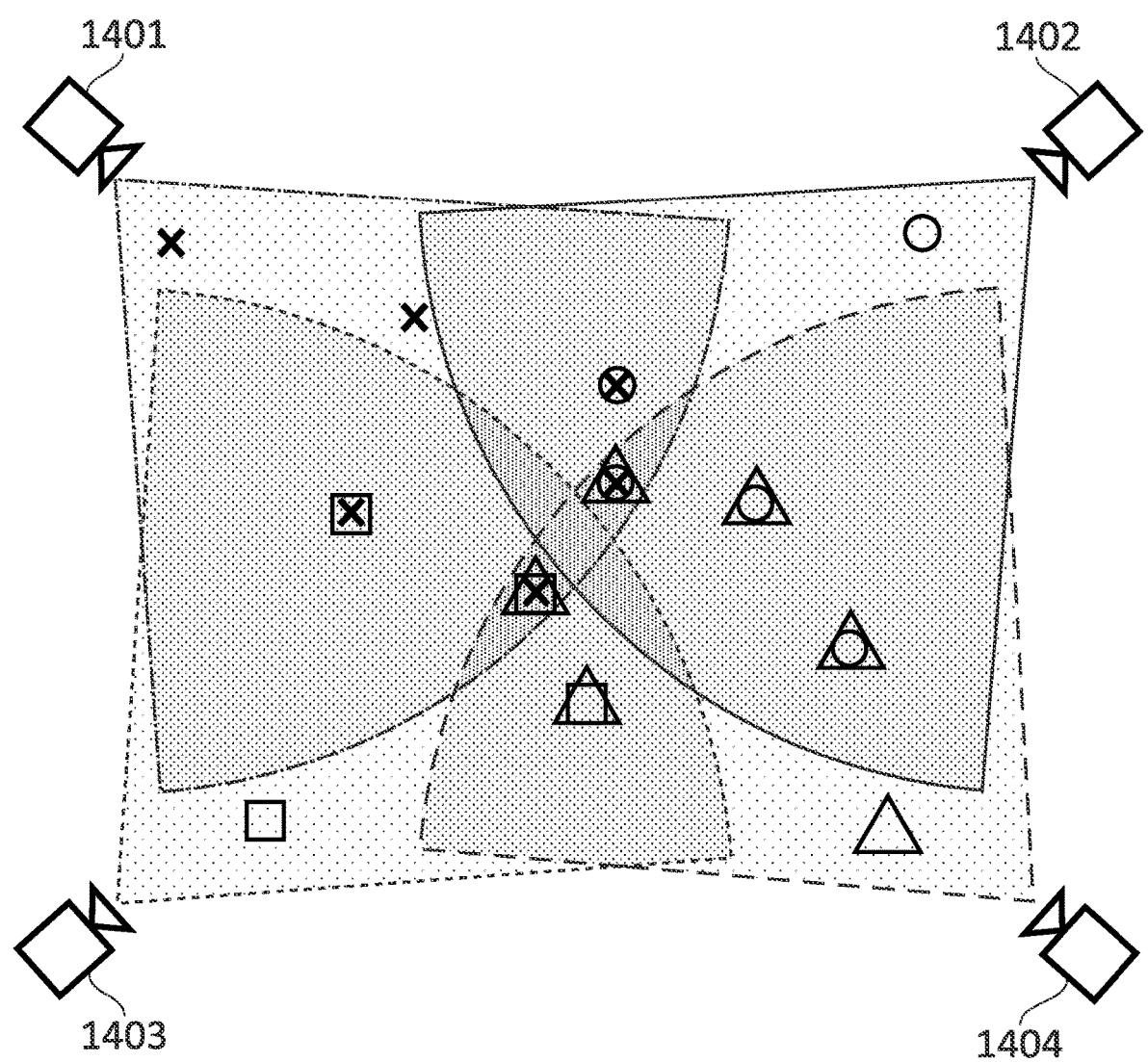
FIG. 14 depicts a collection of animal detecting devices in embodiments.

In embodiments where the central management system 1301 collates information from multiple animal detecting devices, it may be configured to identify when information that was created by different devices relates to the same animals. For example, if the central management system 1301 is provided with the relative location of the multiple animal detecting devices it is possible to identify when a detected animal in the scene of one device corresponds to the same animal as a detected animal in the scene of another device. This can be seen in FIG. 14, which depicts a number of animal detecting devices 1401, 1402, 1403 and 1404 in embodiments. Each obtains images of a particular area, shown as shaded regions of the figure, and detects animals within that area. The calculated position of each animal detected by an animal detecting device is indicated by a symbol corresponding to the device (a cross corresponding to device 1401, a circle corresponding to device 1402, a square corresponding to device 1403 and a triangle corresponding to device 1404). As shown in FIG. 14, the respective areas overlap such that some animals are detected by more than one animal detecting device. The positions of these animals are therefore indicated by multiple symbols. The central management system 1301 could therefore identify that a detected animal in the scene of one device corresponds to the same animal as a detected animal in the scene of another device if the respective positions of the detected animals calculated by each of the two devices coincide.

Identifying when image representation information from different animal detecting devices relates to the same animal reduces the risk of providing the external device 500 with unreliable information. For example, if two animal detecting devices identify that a detected animal is limping it is useful to determine whether there are two separate limping animals or if there has been duplicate information recorded that relates to the same animal. Furthermore, identifying when image representation information from different animal detecting devices relates to the same animal allows the central management system 1301 to provide additional information to the external device 500 reliably when analysis is performed on the combined information. For example, in some embodiments the central management system 1301 plots livestock position over time within a large field containing more than one animal detecting devices. This can be used to identify areas of the field that experience higher rates of wear to grass, fences or the like.

Figure 15:
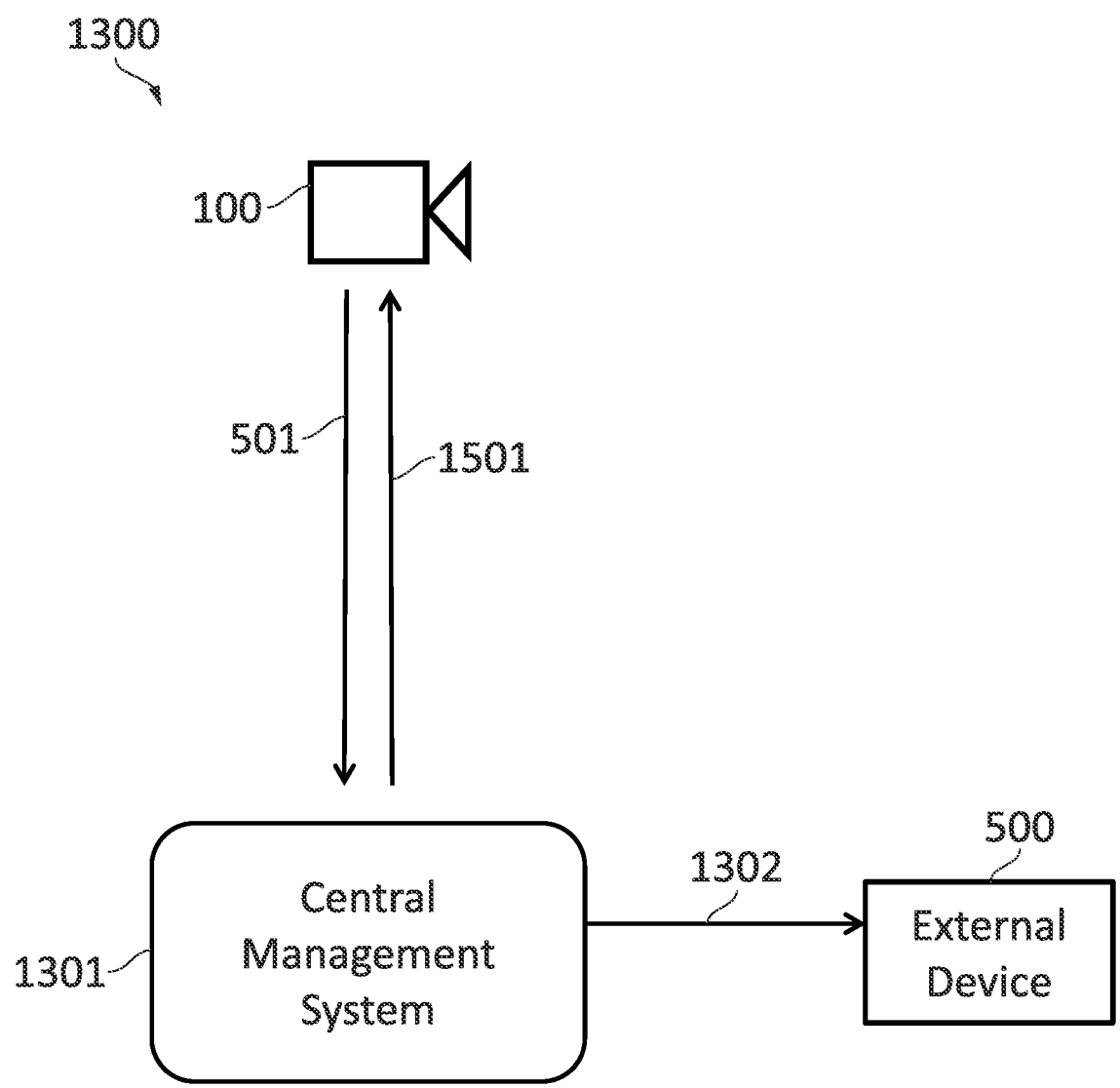
FIG. 15 shows the system 1300 in further embodiments.

FIG. 15 shows the system 1300 in further embodiments of the disclosure. Such embodiments are identical to those discussed earlier with reference to FIG. 13, but with the addition that the central management system 1301 sends information 1501 to the animal detecting device 100.

In some embodiments, the central management system 1301 sends the information 1501 to the animal detecting device 100 according to the content of the image representation information 501 received from the animal detecting device 100. For example, in an embodiment the central management system 1301 may only send the information 1501 if it is determined that the image representation information 501 comprises information which indicates that a detected animal is limping. However, the disclosure is not limited in this regard and the central management system 1301 may send information 1501 to the animal detecting device 100 according to any suitable condition. For example, the central management system 1301 may send the information 1501 according to a result of the analysis result 1302. In another example, the central management system 1301 may send the information 1501 automatically every 24 hours, or in response to receiving image representation information 501.

In embodiments, the information 1501 comprises instructions for the animal detecting device 100 to perform a particular process. For example, the information 1501 may comprise instructions that instruct the animal detecting device 100 to send an alert (such as the alert 1201 discussed above) to a user device if an analysis result 1302 indicates that an animal detected by the animal detecting device 100 has a position within a certain range (e.g. a range corresponding to a restricted area that the animal should not have access to). As another example, the information 1501 may comprise instructions that instruct the animal detecting device 100 to perform additional image processing on a particular image and send the central management system 1301 the corresponding new image representation data, e.g. if the central management system requires more information to produce an accurate analysis result. The information 1501 may additionally or alternatively comprise instructions that instruct the animal detecting device 100 to send other information, such as the total image data for a particular image, to the central management system 1301.

The disclosure is not limited to the above examples however, and in further embodiments the information 1501 comprises information for the animal detecting device 100 to use in image processing. For example, the information 1501 may comprise information that allows the animal detecting device 100 to determine the species of an unknown animal, such that the animal detecting device 100 can use this information in the future to identify animals of the same species during image processing (rather than identifying them as animals of an unknown species). Configuring the system 1300 such that information exchange is possible between the central management system 1301 and the animal detecting device 100 therefore allows more relevant, accurate, reliable and extensive information relating to a scene or scenes to be provided to the external device 500.

Figure 16:
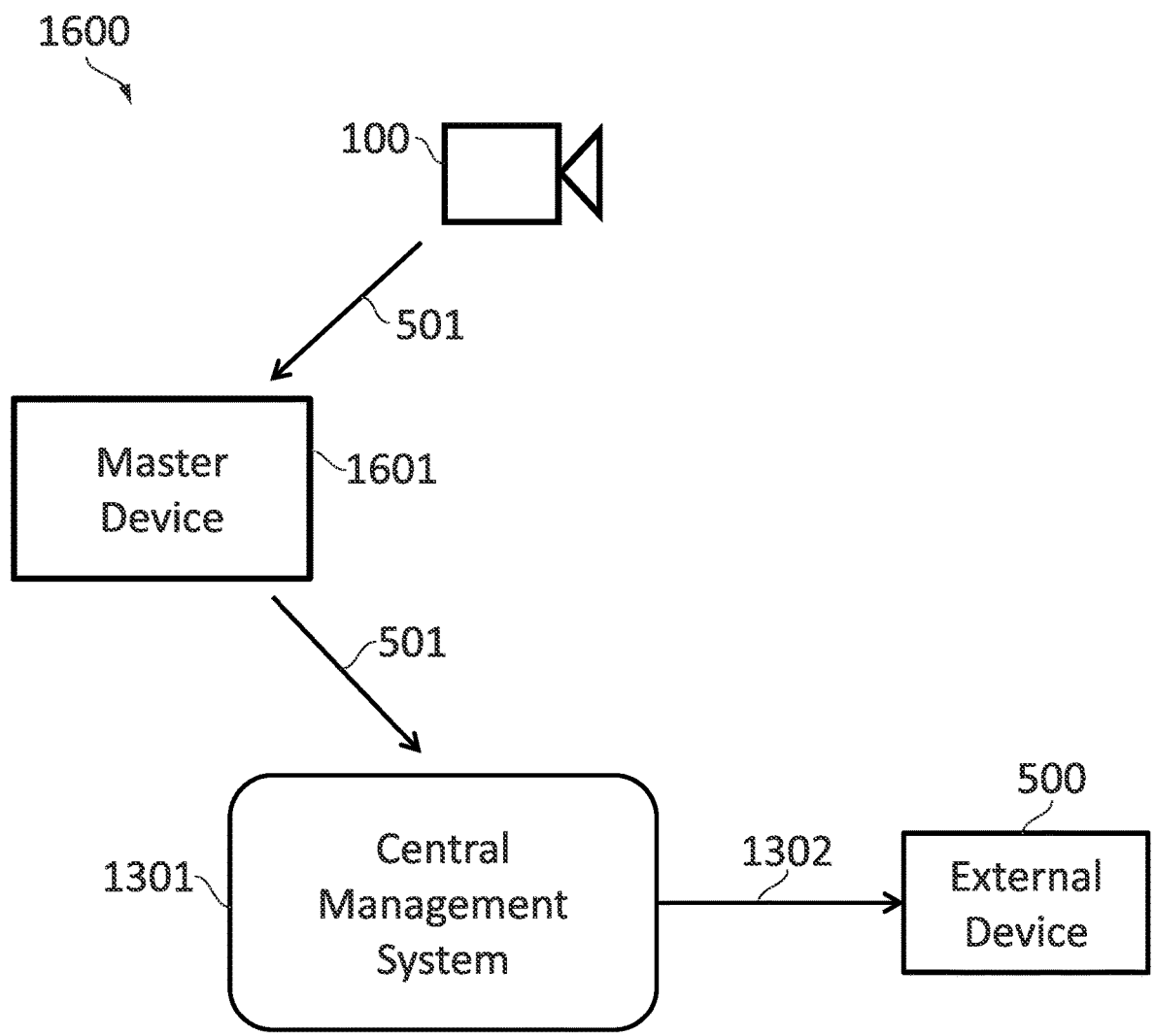
FIG. 16 shows a system 1600 according to embodiments.

FIG. 16 shows a system 1600 according to embodiments. The system 1600 comprises the same components as the system 1300 with the addition of a master device 1601. In the system 1600, the animal detecting device 100 sends image representation information 501 to the central management system 1301 via the master device 1601.

The animal detecting device 100 sends the image representation data 501 to the master device 1601 over any suitable type of communication link known in the art (for example, a wireless or wired connection). Similarly, the master device 1601 may send the image representation data 501 to the central management system 1301 over any suitable type of communication link known in the art. For example, in some embodiments the animal detecting device 100 sends the image representation data 501 to the master device 1601 through a wired connection, whilst the master device 1601 sends the image representation data 501 to the central management system 1301 wirelessly. This is beneficial in situations where, for example, the animal detecting device 100 can only send image representation data 501 via a wired connection but the central management system 1301 is located too far from the animal detecting device 100 to achieve this. In another example, the animal detecting device 100 may be capable of sending image representation data 501 wirelessly but not have a sufficient broadcast range to reach the central management system 1301, or may be otherwise unable to maintain a wireless communication link reliably.

The master device 1601 may be any suitable device capable of receiving and transmitting electronic information. In embodiments, the master device 1601 may be housed by a vehicle such as an unmanned aerial vehicle (UAV) so that its location can be changed dynamically. For example, the master device 1601 may be moved to a location that optimises wireless signal strength between the master device 1601 and the animal detecting device 100 or between the master device 1601 and the central management system 1301. In some embodiments, the master device 1601 may receive image representation information from multiple animal detecting devices and send the received image representation information to the central management system 1301.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the disclosure are provided in the following numbered clauses:

1) An animal detecting device comprising circuitry configured to:
   obtain one or more images;
   perform image processing on the one or more images, wherein the image processing comprises detecting the presence of an animal in one of the one or more images,
   produce, when the presence of an animal is detected, image representation data associated with the one or more images according to a result of the image processing; and send, in the event of a predetermined condition being met, the image representation data to another device over a communication link.

2) An animal detecting device according to any preceding clause, wherein the image representation data is metadata associated with the one or more images.

3) An animal detecting device according to any preceding clause, wherein the predetermined condition relates to a result of the image processing.

4) An animal detecting device according to any preceding clause, wherein the image processing further comprises determining a number of detected animals in one of the one or more images.
5) An animal detecting device according to any preceding clause, wherein the image processing further comprises determining a position of a detected animal in one of the one or more images.
6) An animal detecting device according to any preceding clause, wherein the image processing further comprises identifying a species of a detected animal in one of the one or more images.
7) An animal detecting device according to any preceding clause, wherein the image processing further comprises detecting the presence of a human in one of the one or more images.
8) An animal detecting device according to any preceding clause, wherein the image processing further comprises identifying a pose of a detected animal in one of the one or more images.
9) An animal detecting device according to any preceding clause, wherein the image processing further comprises assigning a detected animal a level of priority.
10) An animal detecting device according to any preceding clause, wherein the circuitry is further configured to send an alert to a user device according to a result of the image processing.
11) An animal detecting device according to any preceding clause, wherein the circuitry is configured to send the image representation data to a central management system.
12) An animal detecting device according to any preceding clause, wherein the circuitry is further configured to receive information relating to a detected animal.
13) An animal detecting device according to any preceding clause, wherein the one or more images are infra-red, near infra-red, Time of Flight, Dynamic Vision Sensing, Structured Light, Radar or Lidar images.
14) An animal detecting device according to any preceding clause, further comprising an image capturing device configured to capture the one or more images.
15) A system comprising:
a central management system; and
an animal detecting device according to any preceding clause, wherein the animal detecting device is configured to send the image representation data to the central management system;
and wherein the central management system is configured to receive the image representation data from the animal detecting device, perform an analysis of the image representation data and send a result of the analysis to another device.
16) A system according to clause 15 further comprising a master device, and wherein the animal detecting device is configured to send the image representation data to the central management system via the master device.

What is claimed is:

1. An animal detecting device comprising circuitry configured to:
obtain one or more images;
perform image processing on the one or more images, wherein the image processing comprises detecting the presence of an animal in one of the one or more images,
produce, when the presence of an animal is detected, image representation data associated with the one or more images according to a result of the image processing; and
send, in the event of a predetermined condition being met, the image representation data to another device over a communication link,
wherein the image representation data is metadata associated with the one or more images,
wherein the predetermined condition relates to a result of the image processing, and
wherein the image processing further comprises assigning a priority level to a detected animal based on one or more characteristics of the detected animal, and wherein the predetermined condition respectively varies depending on whether at least a first priority or a second priority is assigned to the detected animal.

2. The animal detecting device according to claim 1, wherein the image processing further comprises determining a number of detected animals in one of the one or more images.

3. The animal detecting device according to claim 1, wherein the image processing further comprises determining a position of a detected animal in one of the one or more images.

4. The animal detecting device according to claim 1, wherein the image processing further comprises identifying a species of a detected animal in one of the one or more images.

5. The animal detecting device according to claim 1, wherein the image processing further comprises detecting the presence of a human in one of the one or more images.

6. The animal detecting device according to claim 1, wherein the image processing further comprises identifying a pose of a detected animal in one of the one or more images.

7. The animal detecting device according to claim 1, wherein the circuitry is further configured to send an alert to a user device according to a result of the image processing.

8. The animal detecting device according to claim 1, wherein the circuitry is configured to send the image representation data to a central management system.

9. The animal detecting device according to claim 1, wherein the circuitry is further configured to receive information relating to a detected animal.

10. The animal detecting device according to claim 1, wherein the one or more images are infra-red, near infra-red, Time of Flight, Dynamic Vision Sensing, Structured Light, Radar or Lidar images.

11. The animal detecting device according to claim 1, further comprising an image capturing device configured to capture the one or more images.

12. The animal detecting device according to claim 1, wherein the image representation data includes data values indicative of the result of image processing.

13. The animal detecting device according to claim 1, wherein image data associated with the one or more images is not sent by the animal detecting device.

14. A system comprising:
a central management system; and
an animal detecting device having circuitry configured to:
obtain one or more images;
perform image processing on the one or more images, wherein the image processing comprises detecting the presence of an animal in one of the one or more images;
produce, when the presence of an animal is detected, image representation data associated with the one or more images according to a result of the image processing, wherein the image representation data is metadata associated with the one or more images; and send, in the event a predetermined condition being met, the image representation data to the central management system in place of image data;

wherein the image processing further comprises assigning a priority level to a detected animal based on one or more characteristics of the detected animal, and wherein the predetermined condition respectively varies depending on whether at least a first priority or a second priority is assigned to the detected animal, and wherein the central management system is configured to receive the image representation data from the animal detecting device, perform an analysis of the image representation data, and send a result of the analysis to another device.

15. The system according to claim 14, further comprising a master device, and wherein the animal detecting device is configured to send the image representation data to the central management system via the master device.

* * * * *